(12) United States Patent
Boggiano et al.

(10) Patent No.: US 11,386,918 B2
(45) Date of Patent: Jul. 12, 2022

(54) METHOD AND SYSTEM FOR ASSESSING READING QUALITY

(71) Applicant: The University of Chicago, Chicago, IL (US)

(72) Inventors: Jon Boggiano, Portola Valley, CA (US); Jonathan Simon, Portola Valley, CA (US); Alexandra Yorke, Portola Valley, CA (US); Rodrigo Rallo, Portola Valley, CA (US); Chris Boggiano, Portola Valley, CA (US); Nicola Boyd, Portola Valley, CA (US); Phil Balliet, Portola Valley, CA (US)

(73) Assignee: The University of Chicago, Chicago, IL (US)

( * ) Notice: Subject to any disclaimer, the term of this patent is extended or adjusted under 35 U.S.C. 154(b) by 0 days.

(21) Appl. No.: 16/287,951

(22) Filed: Feb. 27, 2019

(65) Prior Publication Data
US 2019/0267027 A1    Aug. 29, 2019

Related U.S. Application Data

(60) Provisional application No. 62/636,035, filed on Feb. 27, 2018.

(51) Int. Cl.
*G10L 25/60* (2013.01)
*G10L 15/05* (2013.01)
*G10L 25/90* (2013.01)
*G10L 25/63* (2013.01)

(52) U.S. Cl.
CPC ............. *G10L 25/60* (2013.01); *G10L 15/05* (2013.01); *G10L 25/63* (2013.01); *G10L 25/90* (2013.01)

(58) Field of Classification Search
CPC ......... G10L 25/60; G10L 15/05; G10L 25/63; G10L 25/90
See application file for complete search history.

(56) References Cited

U.S. PATENT DOCUMENTS

| | | | | |
|---|---|---|---|---|
| 8,226,416 | B2 * | 7/2012 | Abrash | G09B 19/06 434/185 |
| 9,478,143 | B1 * | 10/2016 | Bowen | G09B 5/062 |
| 2015/0170648 | A1 * | 6/2015 | King | G06F 3/167 704/235 |
| 2016/0027321 | A1 * | 1/2016 | Taylor | G09B 17/04 434/180 |
| 2016/0093291 | A1 * | 3/2016 | Kim | H04R 29/008 381/56 |

* cited by examiner

*Primary Examiner* — Sonia L Gay
(74) *Attorney, Agent, or Firm* — Loyal IP Law, PLLC; Travis Banta (57) ABSTRACT

This disclosure generally relates to a system and method for assessing reading quality during a reading session. In one embodiment, system is disclosed that analyzes speech that corresponds to a reading session for the duration of the reading session, the consistency of the reading sessions, the speed of the speech during the reading session, the engagement level of the parent during the reading session, and the environment in which the reading session takes place in another embodiment, a method is disclosed for calculating an objective score for a reading session, communicating the score to a parent, and providing suggestions and challenges for improving future reading sessions.

20 Claims, 6 Drawing Sheets

METHOD AND SYSTEM FOR ASSESSING READING QUALITY

CROSS-REFERENCE TO RELATED APPLICATIONS

This application claims the benefit of U.S. Provisional Application No. 62/636,035, filed Feb. 27, 2018, which is incorporated herein by reference in its entirety, including but not limited to those portions that specifically appear hereinafter, the incorporation by reference being made with the following exception: In the event that any portion of the above-referenced provisional application is inconsistent with this application, this application supercedes said above-referenced provisional application.

BACKGROUND

1. Technical Field

This disclosure relates generally to a system that analyzes a vocalized reading session to objectively assess the quality of the reading session. More specifically, the system disclosed herein uses objective measures to assess a quality of a reading session, communicates the objectively measured quality of the reading session to a reader, and provides feedback for increasing the quality of a reading session.

2. Description of the Related Art

Reading to children is the highlight of the day for many parents. Unfortunately, many times, an opportunity to read to children comes at the end of the day, before bed for example, when parents are the most tired. Thus, although reading to children is the highlight of the day, many parents simply lack the energy or intensity to create a satisfying and rewarding reading experience. The benefits of reading to children are also reduced when parents fail to create an engaging and informative reading environment.

Conventional methods for determining the quality of a reading experience with children have relied on the feelings of parents and children after the reading session has been completed. For parents, on some occasions, the quality of a reading session may be assessed by whether or not a child falls asleep quickly. Parents may also gauge the quality of a reading experience by subjectively assessing the pleasure derived from a reading experience with children or the perceived pleasure derived by a child from the reading experience. Frequently, a parent may judge the quality of a reading session by comparing it to a previous session of reading. For example, a parent may feel more satisfied in the quality of a reading experience if the parent perceives that the reading experience is better than or as good as a reading experience that occurred the night before.

One shortcoming of these conventional methods for assessing the quality of a reading experience is that the feelings of parents or children cannot be consistently analyzed. Similarly, comparing one reading experience to a previous reading experience to assess the quality of a reading experience relies on a small sample size that may not accurately reflect the quality of the reading experiences over time. Further, many parents wish to maximize the benefits of reading to a child for both themselves and their children but are unable to accurately assess whether or not the maximum benefits are obtained for the parent's effort.

It is one object of this disclosure to provide a system that objectively analyzes a reading session. It is a further object of this disclosure to provide objective measurements of a reading session that are comparable to past and future reading sessions. Another object of this disclosure is to enhance a reading session by increasing parent interest and interactivity during a reading session. A further object of this disclosure is to increase the quality of reading sessions for both a parent and the child such that both derive the maximum available benefits for the effort expended.

SUMMARY

In one embodiment, a device comprises a microphone receiving audio input. The device may further include a processor which receives the audio input from the microphone and identifies one or more characteristics of the audio input. The processor may derive an audio input quality score for display on the device based on the identified one or more characteristics of the audio input.

In another embodiment, a system comprises a mobile device, which includes a microphone, a display, and a mobile device processor which receives audio input from the microphone and transmits the audio input, and a server. The server includes a server processor receiving audio input transmitted by the mobile device processor and identifies one or more characteristics of the audio input. The server processor derives an audio input quality score based on the identified one or more characteristics of the audio input. The server processor also transmits the score to the mobile device processor for display on the display of the mobile device.

In another embodiment, a non-transitory computer readable medium is disclosed which, when executed by a processor, causes the processor to perform a method. The method includes receiving audio input via a microphone, identifying one or more characteristics of the audio input, deriving an audio input quality score based on the identified one or more characteristics of the audio input, and displaying the quality score on the display.

BRIEF DESCRIPTION OF THE DRAWINGS

The accompanying drawings illustrate embodiments of methods and systems for assessing reading quality.

DETAILED DESCRIPTION OF PREFERRED EMBODIMENTS

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
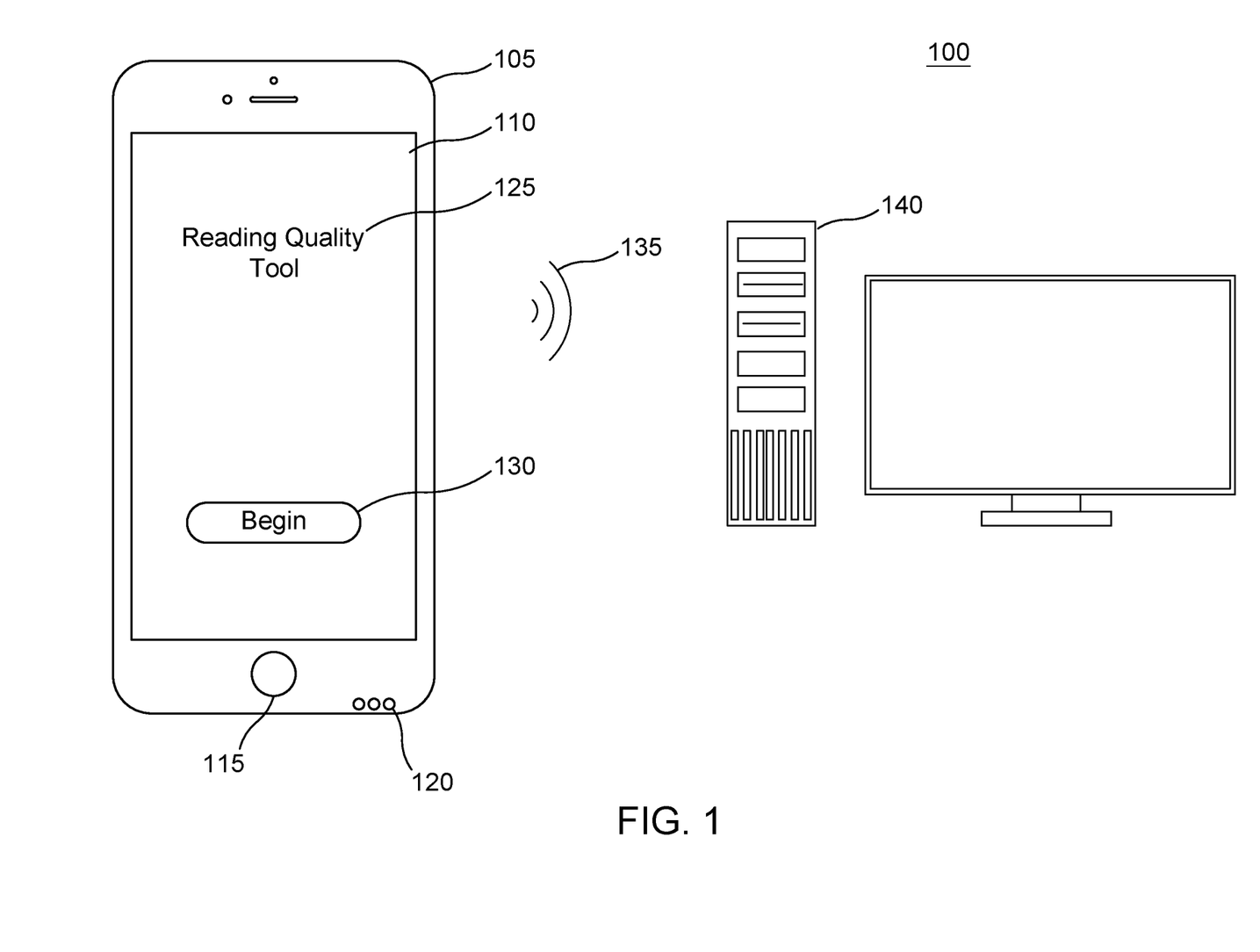
FIG. 1 illustrates an exemplary system for assessing reading quality.

FIG. 1 illustrates an exemplary system 100 for assessing reading quality. System 100 includes a mobile device 105 that may be associated with a user. Mobile device 105 may be implemented by any mobile electronic device, such as a smart phone, a tablet, a personal computer, a music storage and playback device, a personal digital assistant, or any other mobile device capable of implementing a mobile application. Mobile device 105 may include a display screen 110, which may or may not be touch sensitive, and may further include an interactive device 115 which allows a user to provide input into mobile device 105. In one embodiment, interactive device 115 may be implemented as a button or a switch which allows a user to provide input to mobile device 105. In another embodiment, a user may provide input to mobile device 105 by interacting with a touch sensitive display screen 110. Mobile device 105 may also include a microphone 120 for receiving and/or recording speech or other sounds that occur in a particular environment.

Mobile device 105 may include software and hardware modules, sequences of instructions, routines, data structures, display interfaces, and other types of structures that execute computer operations. Further, hardware components may include a combination of Central Processing Units ("CPUs"), buses, volatile and non-volatile memory devices, storage units, non-transitory computer-readable storage media, data processors, processing devices, control devices transmitters, receivers, antennas, transceivers, input devices, output devices, network interface devices, and other types of components that are apparent to those skilled in the art. These hardware components within mobile device 105 may be used to execute the various applications, methods, or algorithms disclosed herein independent of other devices disclosed herein.

Mobile device 105 includes a reading quality tool 125 which may be installed as an executable program on mobile device 105. Reading quality tool 125 may be implemented as a mobile application, a web application, or another type of application as necessary to implement reading quality tool 125. Reading quality tool 125 may be stored as a series of executable instructions within a memory device of mobile device 105. Reading quality tool 125 may further provide an input button 130 via a touch sensitive display screen 110. In one embodiment, a user interacting with input button 130 causes the reading quality tool to begin recording speech or other sounds in the user's environment via microphone 120.

Mobile device 105 may be connected to a server computer 140 via a connection 135. Any suitable connection 135 may be implemented including any wired, wireless, or cellular based connections. Examples of these various connections include implemented using Wi-Fi, ZigBee, Z-Wave, RF4CE, Ethernet, telephone line, cellular channels, or others that operate in accordance with protocols defined in IEEE (Institute of Electrical and Electronics Engineers) 802.11, 801.11a, 801.11b, 801.11e, 802.11g, 802.11h, 802.11i, 802.11n, 802.16, 802.16d, 802.16e, or 802.16m using any network type including a wide-area network ("WAN"), a local-area network ("LAN"), a 2G network, a 3G network, a 4G network, a Worldwide Interoperability for Microwave Access (WiMAX) network, a Long Term Evolution (LTE) network, Code-Division Multiple Access (CDMA) network, Wideband CDMA (WCDMA) network, any type of satellite or cellular network, or any other appropriate protocol to facilitate communication between mobile device 105 and server computer 140.

Server computer 140 may include cloud computers, super computers, mainframe computers, application servers, catalog servers, communications servers, computing servers, database servers, file servers, game servers, home servers, proxy servers, stand-alone servers, web servers, combinations of one or more of the foregoing examples, and any other computing device that may be used to provide analysis services to mobile device 105. Server computer 140 may include software and hardware modules, sequences of instructions, routines, data structures, display interfaces, and other types of structures that execute server computer operations. Further, hardware components may include a combination of Central Processing Units ("CPUs"), buses, volatile and non-volatile memory devices, storage units, non-transitory computer-readable storage media, data processors, processing devices, control devices transmitters, receivers, antennas, transceivers, input devices, output devices, network interface devices, and other types of components that are apparent to those skilled in the art. These hardware components within server computer 140 may be used to execute the various methods or algorithms disclosed herein, and interface with mobile device 105. Mobile device 105 and server computer 140 may implement any application, method, or algorithm described below.

Figure 2:
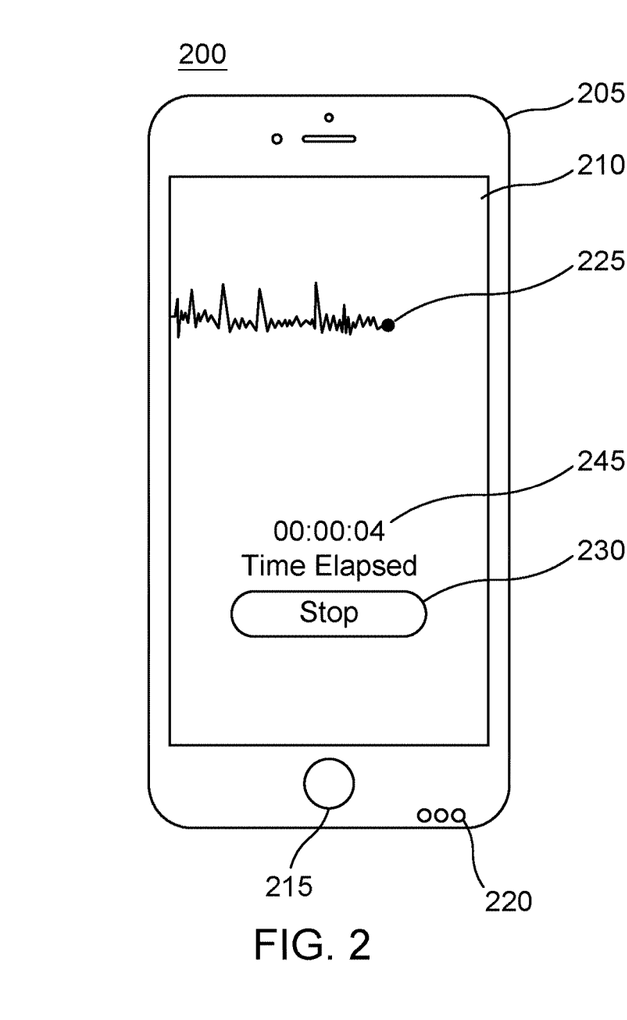
FIG. 2 illustrates a user interface for interacting with a reading quality tool.

FIG. 2 illustrates a user interface 200 for interacting with a reading quality tool, such as reading quality tool 125, shown in FIG. 1 and described above. User interface 200 may be implemented on a mobile device 205 that includes a display screen 210, which are similar in implementation and description to mobile device 105 and display screen 110 shown in FIG. 1 and described above, respectively. Mobile device 205 may further include one or more interactive device 215 and a microphone 220 which are similar in implementation and description to interactive device 115 and microphone 120 shown in FIG. 1 and described above.

User interface 200 may include a visual representation 225 of recorded sound that provides feedback to the user indicating that speech is being recorded. User interface 200 may further provide a timer 245 which indicates an elapsed amount of time for which recording has taken place. User interface 200 may further include an input button 230 via a touch sensitive display screen 210 which allows a user to stop recording sound.

In practice, a user may begin recording sound, such as a reading session with a child, by interacting with input button 130 in FIG. 1. While the user is recording sound, visual representation 225 provides a responsive indicator which provides feedback to the user indicating that recording is occurring. A user may continue recording a reading session until such time as the reading session is finished, during which time timer 245 monitors the elapsed time of the reading session. When the session is finished, a user may interact with input button 230 to indicate via user interface 200 that the reading session has concluded.

While the reading session is being recorded, a processor within a mobile device, such as mobile device 205 may perform preprocessing and assess the physical qualities of sound generated by vocal reading in real time or, the recorded sound may be transmitted by mobile device 205 to a one or more processors in one or more server devices, such as server device 140, shown in FIG. 1, to perform the same preprocessing and assess the physical qualities. Regardless of whether a processor in mobile device 205 or whether a processor in one or more server devices, such as server device 140, performs the preprocessing and assesses the physical qualities of sound generated by the vocal reading, either device essentially performs the same preprocessing and assessment. For example, a processor may normalize an audio volume to ensure that recordings are consistent in terms of distance between the reader and the microphone, environmental conditions, and other variations to ensure that sound being subjected to analysis, has comparable volume.

At this point, the processor may apply a bandpass filter to the received or recorded audio stream to dampen noise in the received or recorded audio that is outside the human vocal range. In one embodiment, the bandpass filter may dampen sound outside of a range of between 100 Hz and 3000 Hz to ensure that noise other than human vocal noise is minimized in the analysis. With the received or recorded video filtered into audio between 100 Hz and 3000 Hz, the processor may segment the received or recorded audio into windows of approximately 40 milliseconds with approximately 30 millisecond overlaps. Here, the term approximately, means within plus or minus 10 milliseconds. Boundary effects created by segmenting or "windowing" the received or recorded audio into windows may be negated by the use of a hamming window in the various 40 millisecond segments.

At this point, the processor may compute an energy level and a cepstral coefficient for each 40 millisecond window. The processor may further identify the maximum cepstral value for a particular pitch in the received or recorded audio between 60 Hz and 400 Hz in each 40 millisecond window. Once the maximum cepstral value for each 40 millisecond window in the received or recorded audio has been identified, the processor may apply a median smoothing function to the identified energy, pitch, and cepstral values and again remove noise in each 40 millisecond window. At this point, the processor may assess a particular window as including voice characteristics if the window has a cepstral value above a particular predetermined level and an energy level above a particular predetermined level. Any 40 millisecond window that has only one of a cepstral value or an energy level above their respective particular predetermined levels or that has both the cepstral value and an energy level below their respective particular predetermined levels is classified by the processor as a "noise frame" or a window that includes noise and no vocal representations.

The processor may aggregate consecutive windows that are identified as including voice characteristics into voiced pulses and discard any voiced pulses that are not characteristic of true vocalizations. For example, a child's scream may have a cepstral value above the particular predetermined level and an energy level above a particular predetermined level but may lack other characteristics (phonetic sounds, tonal indications, or other indicators) that a particular window does not include vocalizations representative of speech. These determinations made by the processor greatly affect the scoring process discussed below.

Figure 3:
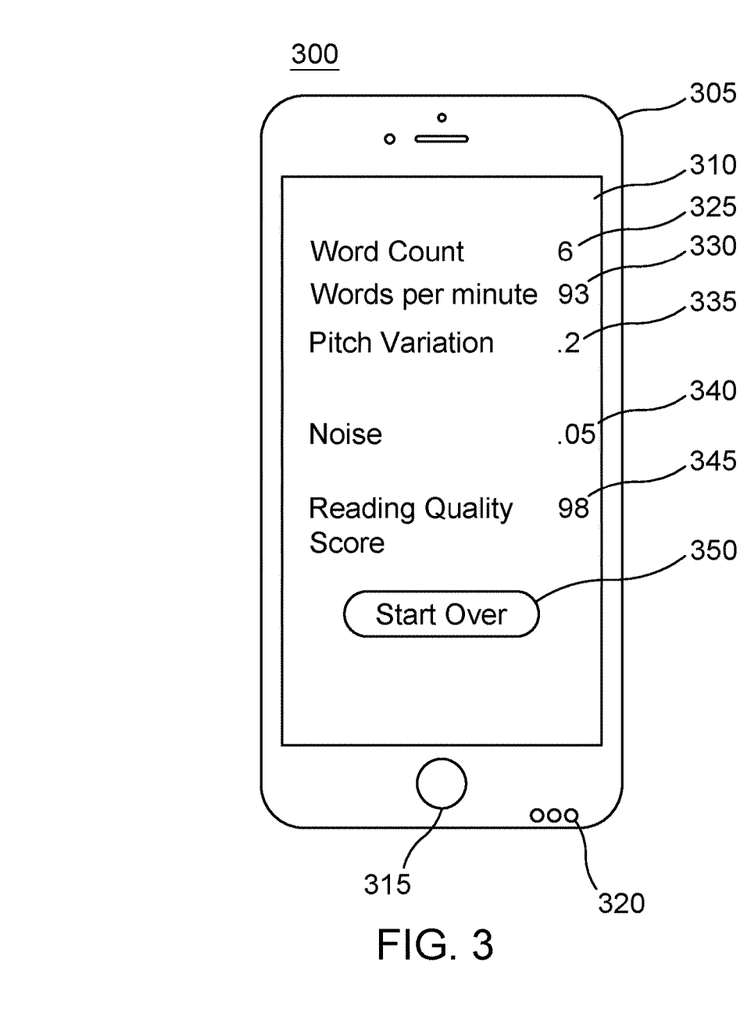
FIG. 3 illustrates a user interface that communicates a quality score for a reading session as assessed by the reading quality tool.

FIG. 3 illustrates a user interface 300 that communicates a quality score for a reading session. User interface 300 may be implemented on a mobile device 305 that includes a display screen 310, which are similar in implementation and description to mobile device 105 and display screen 110 shown in FIG. 1 and described above, respectively. Mobile device 305 may further include one or more interactive device 315 and a microphone 320 which are similar in implementation and description to interactive device 115 and microphone 120 shown in FIG. 1 and described above.

User interface 300 may provide one or more quality metrics of a reading session that has been recorded (such as a reading session that began with respect to FIG. 1 and ended as discussed above with respect to FIG. 2). Quality metrics include a word count 325, a speech pacing metric 330, a pitch variation metric 335, a background noise metric 340, and a reading quality score 345. Optionally, user interface 300 may include an input button 350 via a touch sensitive display screen 310 which allows a user to start a new reading session, effectively restarting reading quality tool 125, shown in FIG. 1 and returning the user to an opportunity to begin a new reading session. Various methods and algorithms for assessing quality metrics will be described in greater detail below.

Figure 4:
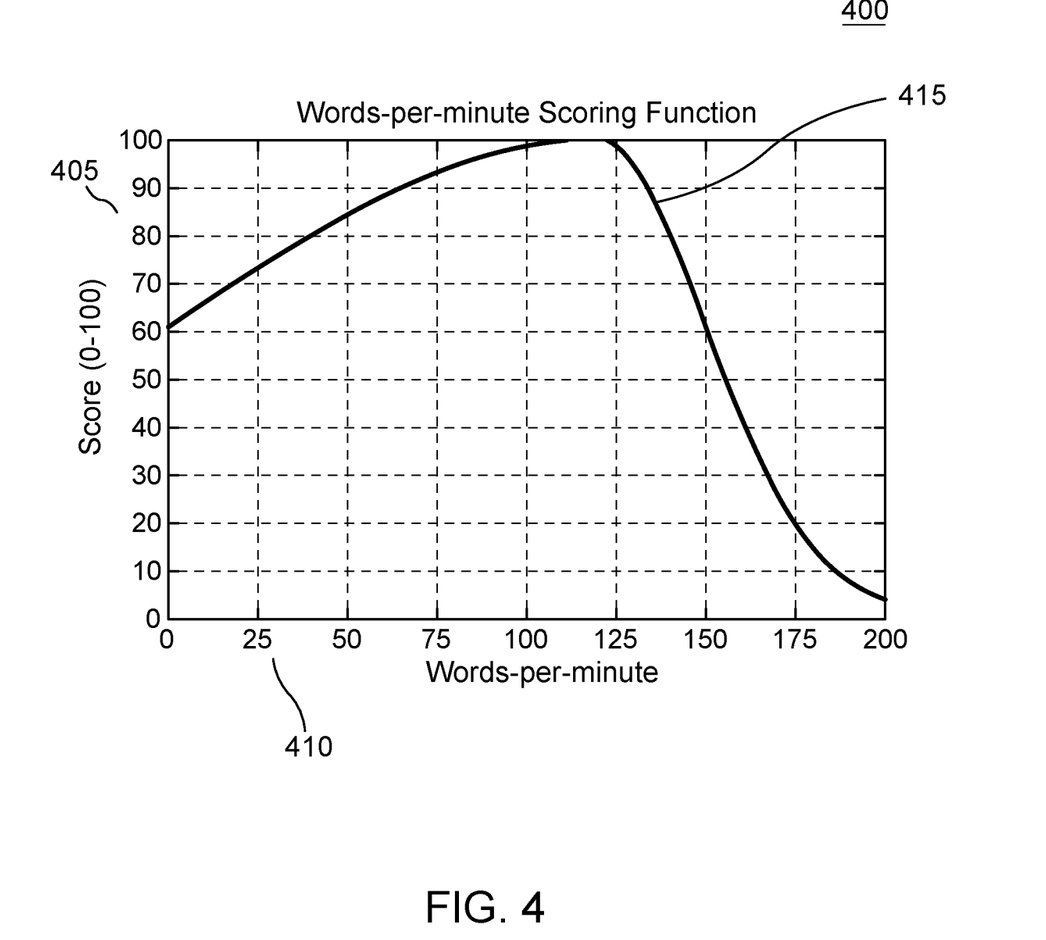
FIG. 4 illustrates a scoring function for a speed of spoken words during a reading session.

FIG. 4 illustrates a scoring function 400 for a speed of spoken words during a reading session. It has been determined that an optimal speed of spoken words for reading to children is approximately between 100 and 125 words per minute. Thus, in assessing a score, a scoring function that maximizes a pacing score, the number of words spoken to a child in a minute, at between 100 and 125 words per minute is desirable. As shown in FIG. 4, a scoring axis 405 correlates a particular score with a words-per-minute axis 410. Scoring axis 405 represents a point total between 0 points and 100 points. Function 415 defines a score allocation for a certain number of words per minute during a reading session. The number of words spoken during a reading session may be identified and calculated in real time. As shown in FIG. 4, a reader is less heavily penalized for speaking slower than 100 words per minute than by speaking faster than 125 words per minute. Function 415 represents an optimal score allocation because children tend to only get bored when being read to at a slower pace. Children tend to understand less, miss story elements, and get frustrated when reading speeds exceed 125 words per minute. Thus, function 415 serves to reward readers who maintain an ideal pacing rate.

An ideal pacing rate may be calculated by a processor within a mobile device such as mobile device 105 shown in FIG. 1 or mobile device 205 shown in FIG. 2 or a processor within server 140, shown in FIG. 1, as previously discussed. Referring to FIG. 2, the processor may identify a number and duration of voiced pulses derived from the 40 millisecond windows discussed above in order to identify a number of words spoken during a particular reading session. The number of words identified as spoken during the particular reading session may divided by a duration of the reading session to determine a rate of speech, which may be scored using function 415, shown in FIG. 4.

Figure 5:
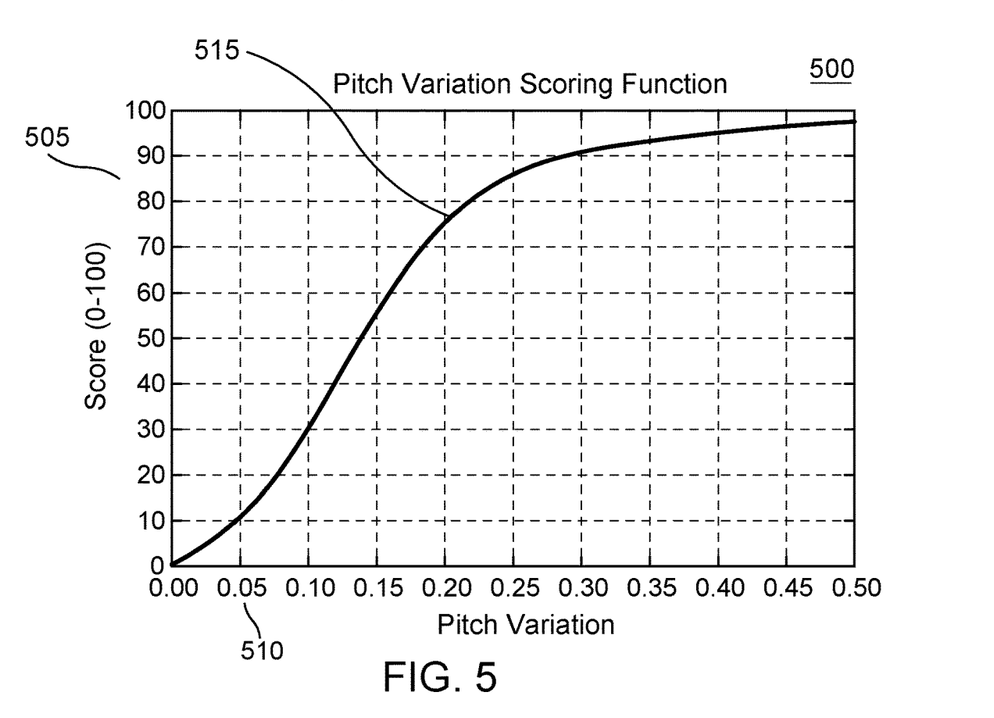
FIG. 5 illustrates a scoring function for pitch variation during a reading session.

FIG. 5 illustrates a scoring function 500 for pitch variation during a reading session. It has been determined that increases in pitch variation during a reading session both facilitate increased interest on the part of the child while also furthering a child's understanding of a story. One other advantage is that when children are thoroughly engaged in a reading session, the reader tends to enjoy a higher degree of satisfaction in the reading experience. Thus, FIG. 5 illustrates a scoring axis 505 and a pitch variation axis 510 that rewards a higher score for an increase in pitch variation during a reading session. Scoring axis 505 represents a point total between 0 points and 100 points.

In one embodiment, pitch variation may be identified by analyzing the various pulses discussed above with respect to FIG. 2 and FIG. 4 and measuring the average pitch of a pulse relative to another pulse using statistical techniques referred to as the coefficient of variation which is a normalized measurement of variance between different pitches in a reader's voice. In testing, excited reading tends to vary a reader's pitch by between approximately (within 10% of) 100 and 400 hz. A greater difference between the average pitches of pulses leads to a higher pitch variation and therefore to a higher score. It should be noted that pitch variation axis 510 is expressed in terms of coefficient of variation. Function 515 rewards users who use significant pitch variation in their reading. An example of pitch variation may include changing voices for different characters in a story, speaking in a soft meek voice to represent a mouse in the story while using a deep booming voice to represent an elephant in the story, for example.

Figure 6:
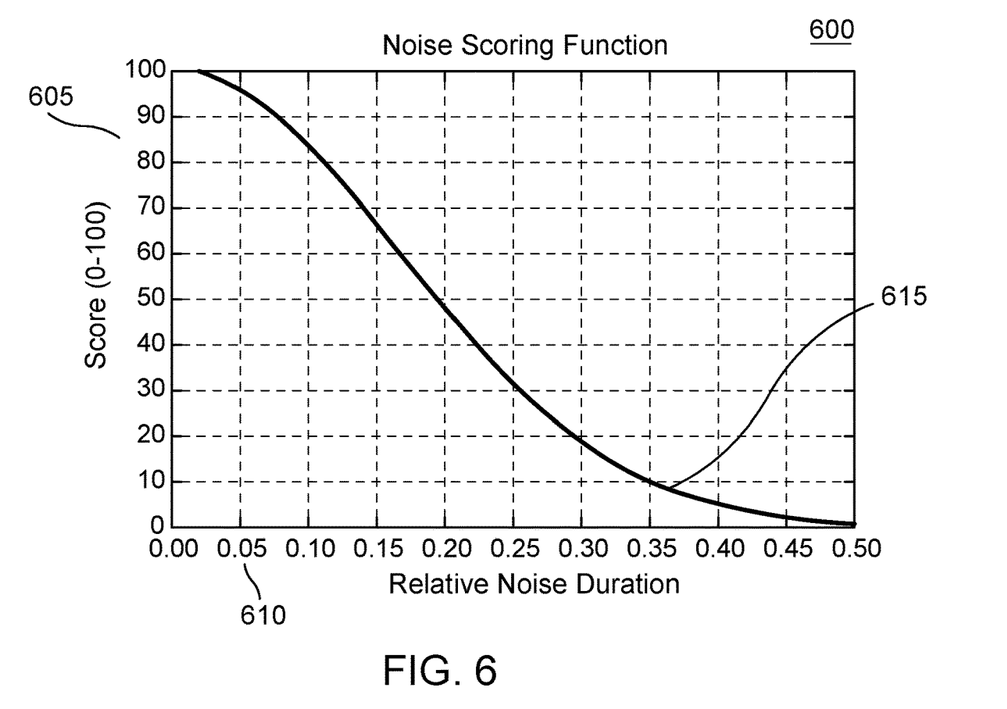
FIG. 6 illustrates a scoring function for a noise threshold for an environment in which a reading session takes place.

FIG. 6 illustrates a scoring function 600 for a noise threshold for an environment in which a reading session takes place. It has been determined that background noise has a detrimental effect on a reading environment. For example, reading to a child while a television is on is less effective than reading to a child while the television is off. Children tend to be distracted by outside noises which decreases an understanding of the story and decreases a child's interest in the story. Accordingly, scoring function 600 rewards relatively noise free reading environments while heavily penalizing relatively noisy reading environments. Scoring function 600 includes a scoring axis 605 which represents a point total between 0 points and 100 points and a relative noise duration scored between 0 seconds and 0.5 seconds. A relative noise duration axis 610 provides relative noise durations in seconds for noise. As shown in FIG. 6, noise score function 615 provides a higher score when noise is detected for a relatively short duration as opposed to when noise persists for a relatively longer duration. In other words, noise generated by a child coughing would likely have a minimal effect on a noise score while noise from a television, for example, may have a significant effect on a noise score.

Noise duration may be assessed by a processor within a mobile device such as mobile device 105 shown in FIG. 1 or mobile device 205 shown in FIG. 2 or a processor within server 140, shown in FIG. 1, as previously discussed. To determine noise duration, the processor may identify each window identified as being a "noise frame" or a window that includes noise and determine whether or not the volume of a particular "noise frame" is within 10 dB of the average vocal volume for the reading session. A duration of all "noise frames" may be aggregated to obtain a noise duration, which may then be scored according to noise score function 615.

Figure 7:
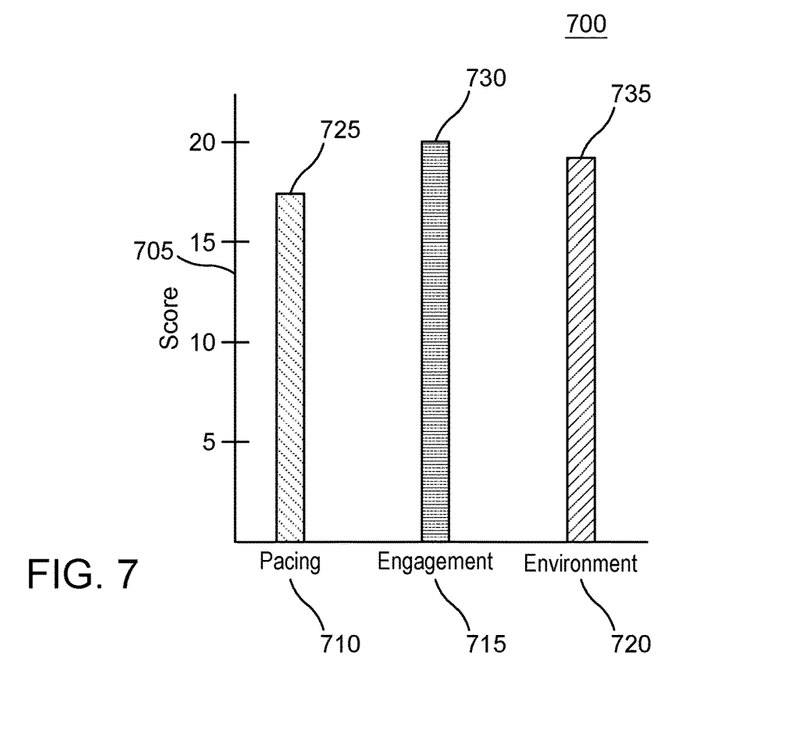
FIG. 7 illustrates a graphical scoring result for a particular reading session.

FIG. 7 illustrates a graphical scoring result 700 for a particular reading session. Graphical scoring result 700 includes a score axis 705 which correlates a score with the following attributes: pacing 710 of the reading session, engagement 715 of the reading session, which may also be referred to as pitch variation of the reading session, and environment 720 of a particular reading session. In this embodiment, only a single reading session is scored. In this example, a reader obtained a pacing score 725 of 17, an engagement score 730 of 20, and an environment score 735 of 18. Thus, the score for this particular exemplary reading session is simply added together to produce a total score of 55.

The score may further be normalized to a 100 point scale. This may be accomplished by simply dividing the total score by the total possible score and obtaining a percentage. In this embodiment, the total score of 55 divided by the total possible score of 60 results in a normalized percentage score of 91.6, which may be further rounded to 92 percent. Weighted scorings are also possible. For example, pacing score 725 could be counted twice to produce a weighted pacing score of 32 out of 40. Engagement score 730 and environment score 735 may be added to the weighted pacing score to produce a total score of 72 out of 80. When normalized to a 100 point scale by dividing 72 by 80, a normalized percentage score of 90 may be obtained. Any combination of weighting of pacing score 725, engagement score 730, and environment score 735 may be used to produce a normalized or non-normalized score.

Figure 8:
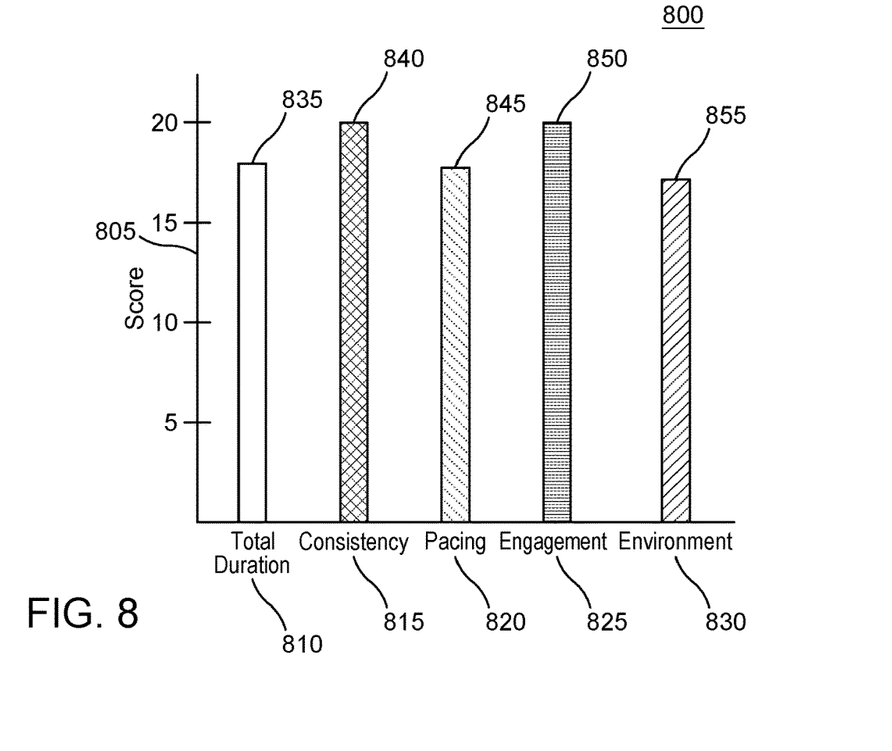
FIG. 8 illustrates a graphical scoring result for a history of reading sessions.

FIG. 8 illustrates a graphical scoring result 800 for a history of reading sessions. Graphical scoring result 800 includes a scoring axis 805 which correlates a score with the following attributes: total duration 810 of a reading session, consistency 815 of reading over time, pacing 820 of the reading session, engagement 825 of the reading session, which may also be referred to as pitch variation of the reading session, and environment 830 of a particular reading session. In this embodiment, a history of reading sessions are factored into an overall score for one or more reading sessions. In this example, a score is generated that takes into account both a particular reading session and a history of other reading sessions.

For example, a total duration score 835 may be scored based on a duration of a reading session. It has been determined that a half hour session is an ideal amount of time to read to a child. Thus, a full point score is based on continuing to read for a full half hour. Any total duration of reading less than a half an hour may be scored accordingly. As shown in FIG. 8, a time duration of a particular reading session fell short of a full half hour and so was given a total duration score 835 of 18.

A consistency score 840 may be scored based on the consistency of reading sessions from day to day. It has been determined that reading every day is ideal for reading to a child. Thus, a full point score is based on reading to a child each day. Any days where reading is not accomplished may be factored into a consistency score accordingly. Scoring may also be based on a rolling average such that missing a single reading session is not continually included in a score. Thus, for example, consistency may be judged on a rolling 10 day average, or a 20 day average, or a 30 day average, or some other number of days. In this manner, a parent may stay motivated even if perfection is no longer possible because missed reading sessions are not forever counted against a consistency score. As shown in FIG. 8, a consistency score 840 for a history of reading sessions is rated at a score of 20 indicating that reading sessions have occurred over a past number of days.

Pacing 820, engagement 825, and environment 830 may be scored as discussed with respect to FIG. 7. In the example of FIG. 8, a reader obtained a pacing score 845 of 18, an engagement score 850 of 20, and an environment score 855 of 17. Thus, the score for this particular exemplary reading session is simply added together to produce a score of 93. It should also be noted that other calculations are possible in order to weight one or more of the previously described attributes in generating a particular score. Scores may also be normalized to a 100 point scale, even when particular scoring elements are weighted.

Figure 9:
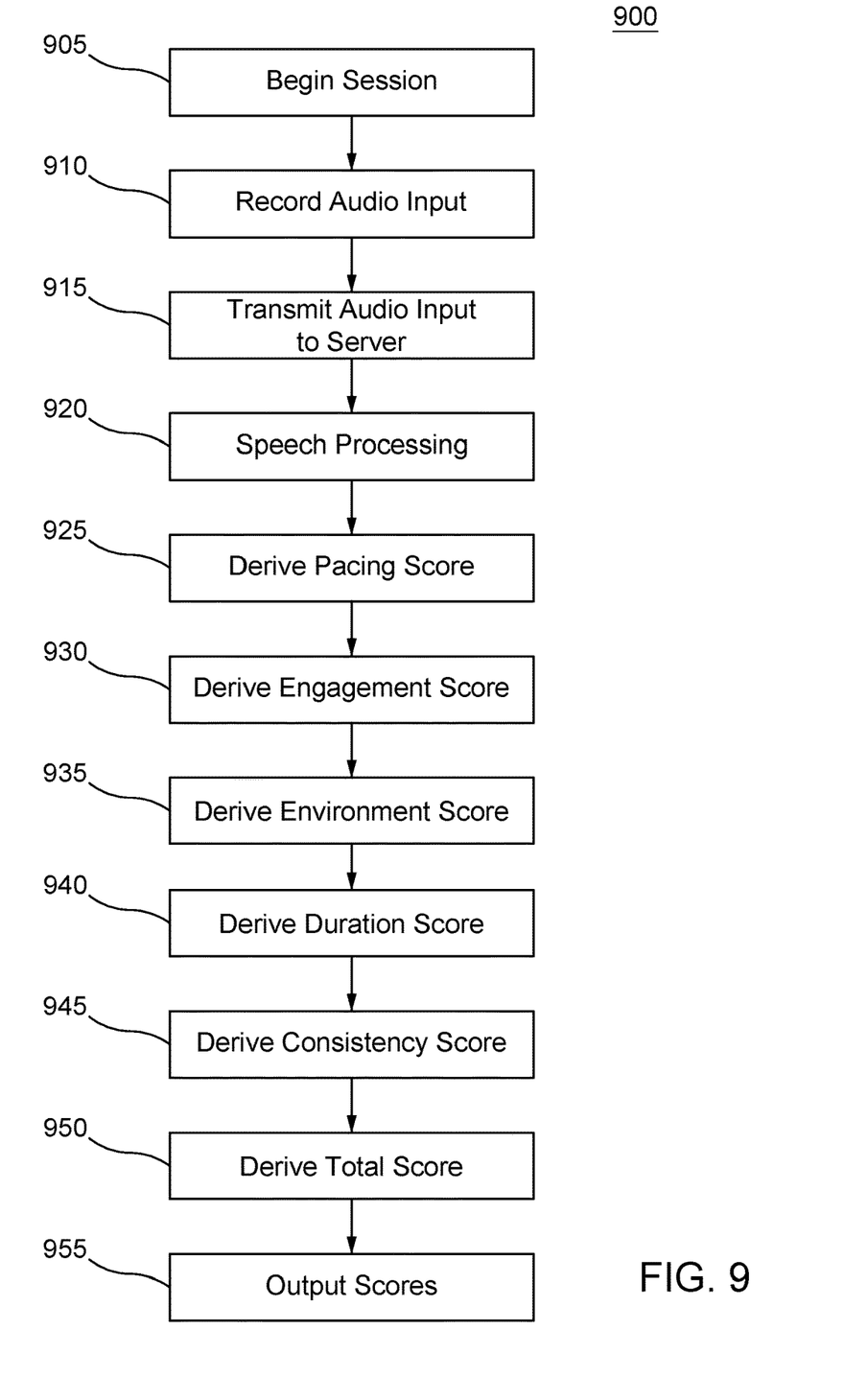
FIG. 9 illustrates a flowchart of a method for deriving a total reading quality score and communicating the score to a user.

FIG. 9 illustrates a flowchart of a method 900 for deriving a total reading quality score and communicating the score to a user. Method 900 begins with a user providing input to a device, such as a mobile device, that indicates a reading session is to begin at step 905. Once the session has begun at step 905, a reading session may begin which is recorded as audio input by the mobile device at step 910. As the audio input is recorded by the mobile device at step 910, the mobile device may transmit audio input to a server computer at step 915. Alternatively, after the audio input is recorded by the mobile device at step 910, the mobile device may then transmit the audio to the server computer.

In either alternative, the server computer processes the audio input as speech at step 920. The speech being processed includes speech of a reading session, for example, a parent reading to a child. In one embodiment, speech may be transcribed by server computer to identify a particular book being read by comparing the transcription to known books within a database. The server computer may further analyze the speech to identify an appropriate age range for both the vocabulary and the age range of a particular book to assess an appropriate grade level for the book. In other words, the server computer may determine that the vocabulary of a particular book is targeted at a 2 year old child or a 7 year old child, for example. The server computer may also identify one or more speakers to identify a child asking questions, a parent's reading, or if there are multiple speakers in a particular reading environment. The server computer may also detect whether recorded speech is reading or if the speech is conversational in nature.

In any case, speech processing step 920 may analyze the audio input by dividing the audio into a series of 40 millisecond windows and assessing the audio properties of each of the windows, for example, identifying which windows include speech and which windows do not include speech. Once so divided, the server computer may identify a rate of speech, or a pacing in words per minute of the speech using techniques previously discussed. The server computer may further identify the pitch variation between consecutive or non-consecutive windows of audio information. The server computer may also identify the amount of background noise in the windowed audio pulses and the relative intensity of the background noise. For example, non-vocal noises that are within 10-15 decibels of an average volume of speech may be disruptive to a reading session and therefore counted as background noise.

Once the recorded speech has been processed at step 920, the server computer may derive a pacing score at step 925 based on the average number of words per minute spoken during the reading session. The server computer may determine a score by comparing the detected number of spoken words per minute to scoring function 400, shown in FIG. 4 and assigning a pacing score.

The server computer may further derive an engagement score at step 930 based on the average pitch variation ascertained during speech processing step 920. The server computer may determine a score by comparing the detected average pitch variation between windows of audio input to scoring function 500, shown in FIG. 5 and assigning an engagement or pitch variation score.

The server computer may further derive an environment score at step 935 based on the average amount of noise in the background of each of the windows of audio input ascertained during speech processing step 920. The server computer may determine a score by comparing the detected average background noise between windows of audio input to scoring function 600, shown in FIG. 6 and assigning an environment or background noise score.

The server computer may further derive a duration score at step 940 based on the duration of the audio input transmitted to the server computer. The closer to one half hour of duration the audio input is, the higher the duration score. Similarly, the server computer may further derive a consistency score at step 945 by determining how many days out of a past particular number of days a reading session occurred and assigning a score accordingly.

Once each individual score is derived at steps 925-945, the server computer may derive a total score at step 950 for a reading session using techniques described above. Total scores may be derived by simple addition of all the scores, or by simple addition of the weighted scores, or by normalizing the weighted or non-weighted total score to a 100 point scale, as discussed above.

Once a total score is derived at step 950, the server computer may output a score report at step 955. Outputting a score report may take on several different forms. For example, the server computer may transmit the scores generated in steps 925-950 back to the mobile device for display on the mobile device or the mobile device may generate the score itself. Alternatively, the server computer may prepare a textual message, such as an SMS message or an email that provides the scores generated in steps 925-950 to a user. Alternatively, the server computer may provide access to a user to scores generated in steps 925-950 via a web based computer system. Regardless of the method of output, information additional to the scores identified during steps 925-950 may be provided. For example, the server computer may transmit suggestions for books to be considered for a future reading session. Alternatively, the server computer may transmit recommendations for a book of an appropriate vocabulary level, a book with an appropriate subject matter for a child of a certain age, and a book that might stretch a child's vocabulary abilities to facilitate learning. The server computer may also make suggestions for a most effective time of day to conduct a reading session with a child based on better scores being derived at when a reading session is conducted at one time of day versus another time of day.

The server computer may also transmit a survey to a user to resolve anomalous findings during speech processing step 920. For example, if a high noise threshold has been determined and a low environment score has been derived at step 935 and output at step 955, the server computer may query the user to identify the source of the noise and provide a suggestion to remediate the noise. The server computer may also provide challenges as part of the score output in step 955 that may help guide a user to ideal reading practices. For example, the server computer may challenge the user to read 8 books to a child each month or the server computer may challenge the user to read a particular character's lines in a book with a particular voice and another character's lines in the book with another voice to increase pitch variation and the derived engagement score. A multitude of challenges are possible. The point, however, is that the server computer may issue challenges to direct and assist a user to increase a particular score derived in steps 925-950.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A device, comprising:
   a microphone receiving audio input representative of reading,
   a processor, the processor receiving the audio input representative of reading from the microphone, identifying characteristics of the audio input, and determining a reading quality score for display on the device based on the identified characteristics of the audio input representative of reading,
   wherein the identified characteristics of the audio input representative of reading include a pacing score, an engagement score, and an environment score for the audio input representative of reading,
   wherein determining the reading quality score is based on a combination of the pacing score, the engagement score, and the environment score, and the pacing score, the engagement score, and the environment score are determined only when the microphone is receiving audio input representative of reading,
   wherein the audio input received is human speech from one or more individuals, and
   wherein the processor differentiates between an audio input of human speech from a first individual and an audio input of human speech from a second individual and further differentiates whether either individual is reading or engaging in conversation in determining the environment score.

2. The device of claim 1, wherein the audio input of human speech includes audio input from the one or more individuals engaged in reading.

3. The device of claim 1, wherein the pacing score includes identifying a number of words per minute in the audio input representative of reading.

4. The device of claim 1, wherein the engagement score includes identifying an engagement level of the audio input representative of reading.

5. The device of claim 4, wherein the engagement level of the audio input representative of reading is the pitch variation of the human speech in the audio input representative of reading.

6. The device of claim 1, wherein the environment score includes identifying a level of noise in the audio input representative of reading.

7. The device of claim 1, wherein identifying characteristics of the audio input representative of reading includes identifying a duration of the audio input representative of reading.

8. The device of claim 1, wherein the audio input includes at least a portion of a reading session and the processor identifies a consistency of reading sessions.

9. The device of claim 1, wherein the processor causes the pacing score, the engagement score, and the environment score to be displayed on a display associated with the device.

10. A system, comprising,
    a mobile device, comprising:
    a microphone receiving audio input representative of reading,
    a display,
    a mobile device processor, the mobile device processor receiving the audio input from the microphone and transmitting the audio input representative of reading;
    a server including a server processor receiving the audio input representative of reading transmitted by the mobile device processor and identifying characteristics of the audio input representative of reading, and determining a reading quality score based on the identified characteristics of the audio input representative of reading,
    wherein the identified characteristics of the audio input representative of reading include a pacing score, an engagement score, and an environment score for the audio input representative of reading,
    wherein determining the reading quality score is based on a combination of the pacing score, the engagement score, and the environment score, and the pacing score, the engagement score, and the environment score are determined only when the microphone is receiving audio input representative of reading,
    wherein the server processor transmits the score to the mobile device processor for display on the display of the mobile device,
    wherein the audio input received is human speech from one or more individuals, and
    wherein the server processor differentiate between an audio input of human speech from a first individual and an audio input of human speech from a second individual and further differentiates whether either individual is reading or engaging in conversation in determining the environment score.

11. The system of claim 10, wherein the audio input of human speech is produced by the one or more individuals engaged in reading.

12. The system of claim 10, wherein the pacing score includes identifying a number of words per minute in the audio input representative of reading.

13. The system of claim 10, wherein the engagement score includes identifying an engagement level of the audio input representative of reading.

14. The system of claim 13, wherein the engagement level of the audio input representative of reading is the pitch variation of the human speech in the audio input representative of reading.

15. The system of claim 10, wherein the environment score includes identifying a level of noise in the audio input representative of reading.

16. The system of claim 10, wherein identifying characteristics of the audio input representative of reading includes identifying a duration of the audio input representative of reading.

17. A non-transitory computer readable medium which, when executed by a processor, causes the processor to execute a method, the method comprising:
    receiving audio input via a microphone representative of reading;
    identifying characteristics of the audio input representative of reading;
    determining a reading quality score based on the identified characteristics of the audio input representative of reading;

wherein the identified characteristics of the audio input representative of reading include a pacing score, an engagement score, and an environment score for the audio input representative of reading, wherein determining the reading quality score is based on a combination of the pacing score, the engagement score, and the environment score, and the pacing score, the engagement score, and the environment score are determined only when the microphone is receiving audio input representative of reading, displaying the quality score on a display, wherein the audio input received is human speech from one or more individuals, and wherein the processor differentiates between an audio input of human speech from a first individual and an audio input of human speech from a second individual and further differentiates whether either individual is reading or engaging in conversation in determining an environment component of the reading quality score.

18. The non-transitory computer readable medium of claim 17, wherein the audio input of human speech is from the one or more individuals engaged in reading.

19. The non-transitory computer readable medium of claim 17, wherein identifying characteristics of the audio input representative of reading includes:

identifying a duration of the audio input.

20. The non-transitory computer readable medium of claim 17, wherein pacing in the pacing score of the audio input representative of reading is identified in words per minute.

* * * * *